(12) United States Patent
Zalanca et al.

(10) Patent No.: US 8,109,000 B2
(45) Date of Patent: Feb. 7, 2012

(54) SALISBURY AXLE ASSEMBLY

(75) Inventors: George Zalanca, Windsor (CA);
Gregory Joseph Hilker, Canton, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 1253 days.

(21) Appl. No.: 11/756,173

(22) Filed: May 31, 2007

(65) Prior Publication Data

US 2008/0295643 A1 Dec. 4, 2008

(51) Int. Cl.
*B62D 11/00* (2006.01)
(52) U.S. Cl. ............ 29/897.2; 29/897; 29/511; 74/607; 74/606 R
(58) Field of Classification Search ............... 29/897.2, 29/897, 511, 525; 74/607, 606 R
See application file for complete search history.

(56) References Cited

U.S. PATENT DOCUMENTS

| | | | |
|---|---|---|---|
| 1,350,829 A * | 8/1920 | Murray | 29/414 |
| 1,715,135 A | 5/1929 | Lambert | |
| 2,204,287 A | 6/1940 | Wilber | |
| 2,477,576 A | 8/1949 | Buckendale | |
| 2,685,479 A | 8/1954 | Buckendale | |
| 2,752,673 A | 7/1956 | Williams | |
| 3,015,238 A | 1/1962 | Williams | |
| 3,446,738 A * | 5/1969 | Eickemeyer et al. | 508/439 |
| 3,804,467 A | 4/1974 | Austermann | |
| 4,751,853 A * | 6/1988 | Dissett | 475/226 |
| 4,790,472 A * | 12/1988 | Bunkoczy | 228/171 |
| 5,429,423 A | 7/1995 | Pollock et al. | |
| 6,585,331 B2 | 7/2003 | Varela | |
| 6,609,649 B1 | 8/2003 | Barnholt et al. | |
| 7,013,697 B2 * | 3/2006 | Barber | 72/370.06 |
| 7,021,721 B2 * | 4/2006 | Eschenburg | 301/124.1 |
| 2004/0149078 A1 * | 8/2004 | Melton et al. | 74/607 |
| 2005/0082780 A1 * | 4/2005 | Seeds et al. | 280/93.512 |
| 2006/0032895 A1 * | 2/2006 | Durand et al. | 228/234.1 |

* cited by examiner

*Primary Examiner* — David Bryant
*Assistant Examiner* — Christopher Besler
(74) *Attorney, Agent, or Firm* — Harness, Dickey & Pierce, P.L.C.

(57) ABSTRACT

A method of forming a Salisbury axle that includes: forming an assembly having a housing that is made of nodular iron, the housing having an opening and a pair of apertures; removing a pair of caps from the housing to expose a pair of journals; installing a differential through the opening to the journals; replacing the caps to the journals; forming a pair of axle tubes from a high strength steel, each of the axle tubes having a circular proximal end, a circular distal end and a mount portion between the proximal and distal ends, the proximal ends of the axle tubes being larger in diameter than the apertures, the mount portion having a top wall and a pair of opposite side walls that are oriented generally perpendicular to the top wall; and inserting the proximal ends of the axle tubes into the apertures. A Salisbury axle is also provided.

13 Claims, 5 Drawing Sheets

SALISBURY AXLE ASSEMBLY

INTRODUCTION

The present invention generally relates to axle assemblies and more particularly to a Salisbury axle having contoured axle tubes.

Modern consumer preferences for vehicles having increased towing and/or payload capacities in conjunction with demands for reduced fuel consumption challenge vehicle manufacturers to provide vehicle drivelines that are increasingly lighter and stronger.

Existing Salisbury axles utilize axle tubes that typically employ circular and/or oval cross-sections at various points along their length. Circular shaped cross-sections are extremely common as they are relatively simple in shape and easy to manufacture. We noted, however, that as the geometry of such circular shaped cross-sections permits a relatively limited load bearing capacity, it would be possible to reduce the weight of a Salisbury axle and/or increase the gross axle weight rating of a Salisbury axle if the shape of the axle tubes were to be changed to increase their section modulus. In this regard, the section modulus of an axle tube is inversely proportional to the bending moment acting on the axle tube. As the fatigue life of an axle tube is inversely related to the bending moment applied to the axle tube, an increased section modulus also increases fatigue life.

Accordingly, their remains a need in the art for an improved Salisbury axle having axle tubes that can permit an increase in the section modulus relative to a Salisbury axle with axle tubes that are circular in cross-sectional shape.

SUMMARY

In one form, the present teachings provide a method of forming a Salisbury axle. The method can include: forming a Salisbury carrier assembly having a Salisbury carrier housing that is made of nodular iron, the Salisbury carrier housing having a differential opening, a first axle tube aperture and a second axle tube aperture; removing a pair of bearing caps from the Salisbury carrier housing to expose a pair of bearing journals; installing a differential to the bearing journals, the differential being received through the differential opening in the Salisbury carrier housing; replacing the pair of bearing caps to the bearing journals to permit the differential to be supported for rotation by the Salisbury carrier housing about an axis that extends through the first and second axle tube apertures; forming a pair of axle tubes from a high strength steel, each of the axle tubes having a circular proximal end, a circular distal end and a mount portion between the proximal and distal ends, the proximal ends of the axle tubes being larger in diameter than the first and second axle tube apertures, the mount portion having a top wall and a pair of opposite side walls, the side walls being oriented generally perpendicular to the top wall; and inserting the proximal ends of the axle tubes into the first and second axle tube apertures.

In another form, the present teachings provide a Salisbury axle that includes a Salisbury carrier assembly, a differential, and a pair of axle tubes. The Salisbury carrier assembly has a Salisbury carrier housing and a pair of bearing caps. The Salisbury carrier housing is formed of a first material and defines a differential opening, a first axle tube aperture and a second axle tube aperture. The differential is received through the differential opening in the Salisbury carrier. The bearing caps secure the differential to the Salisbury carrier housing for rotation about an axis that extends through the first and second axle tube apertures. The axle tubes are formed of a second material that is different from the first material. Each of the axle tubes includes a proximal end with a circular outer surface, a distal end with a circular outer surface, and mount portion between the proximal and distal ends. The proximal ends of the axle tubes are received in an associated one of the first and second axle tube apertures and engage the Salisbury carrier housing via an interference fit. The mount portion has a top wall and a pair of opposite side walls. The side walls are oriented generally perpendicular to the top wall.

In yet another form, the present teachings provide a method of forming a Salisbury axle. The method includes: forming a Salisbury carrier assembly having a Salisbury carrier housing that is made of nodular iron, the Salisbury carrier housing having a differential opening, and a pair of collars, each of the collars defining an axle tube aperture and a hole that extends through the collar and intersects the axle tube aperture; removing a pair of bearing caps from the Salisbury carrier housing to expose a pair of bearing journals; installing a differential to the bearing journals, the differential being received through the differential opening in the Salisbury carrier housing; replacing the pair of bearing caps to the bearing journals to permit the differential to be supported for rotation by the Salisbury carrier housing about an axis that extends through the axle tube apertures; forming a pair of axle tubes from a high strength steel, each of the axle tubes having a circular proximal end, a circular distal end and a mount portion between the proximal and distal ends, the proximal ends of the axle tubes being larger in diameter than the axle tube apertures, the mount portion having a top wall that is substantially flat; inserting the proximal ends of the axle tubes into the axle tube apertures; and welding the axle tubes through the holes in the collars to inhibit rotation of the axle tube relative to the Salisbury carrier housing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
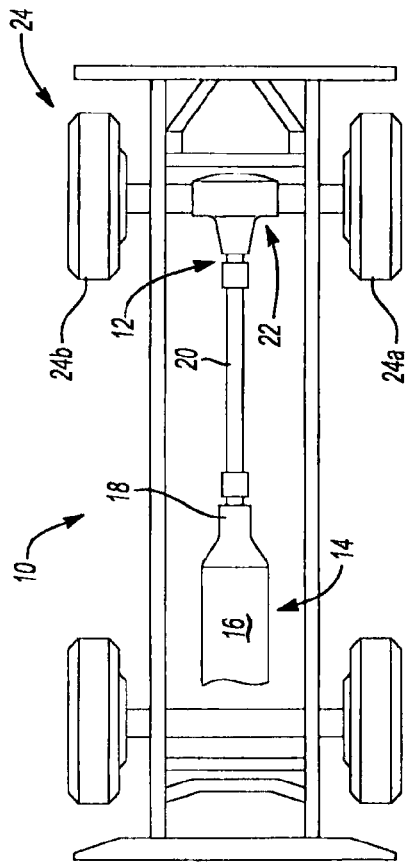
FIG. 1 is a schematic illustration of a vehicle having a rear axle constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a drive shaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The drive shaft 20 can be coupled for rotation with the output of the transmission 18. Drive torque can be transmitted through the drive shaft 20 to the rear axle 22 where it can be selectively apportion in a predetermined manner to the left and right rear wheels 24a and 24b, respectively.

Figure 2:
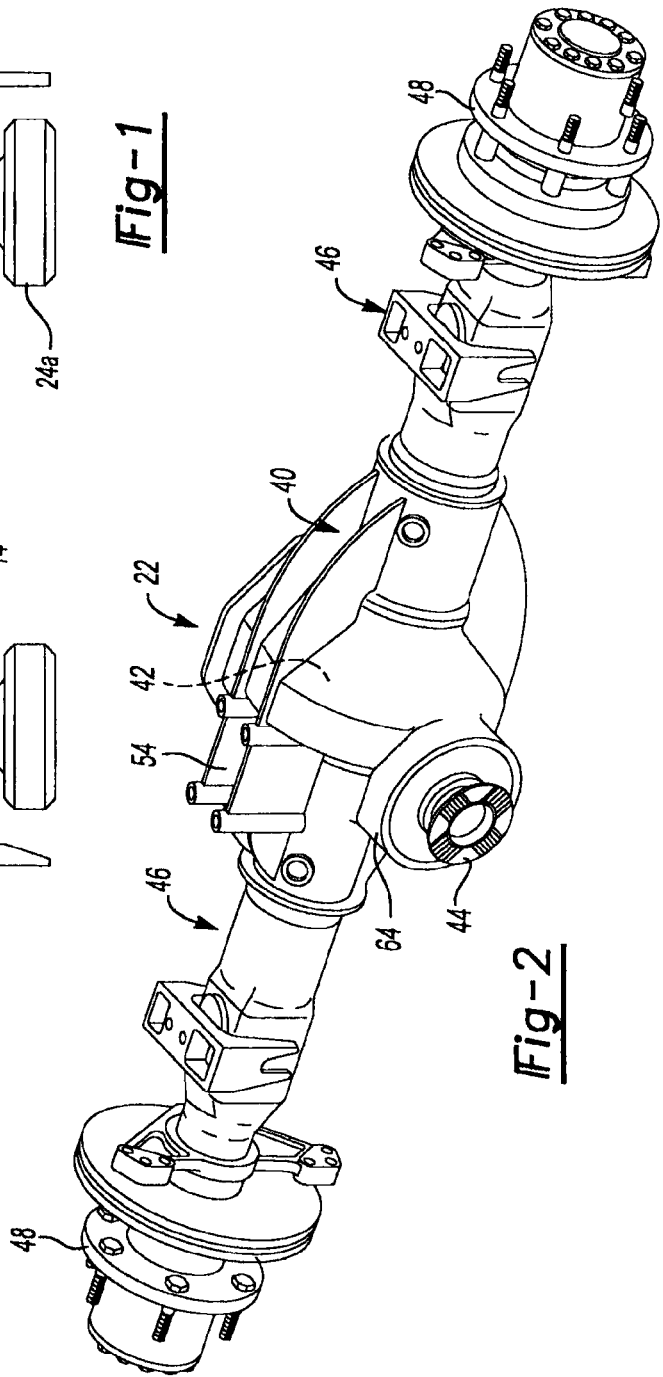
FIG. 2 is a front perspective view of the rear axle of FIG. 1.
Figure 3:
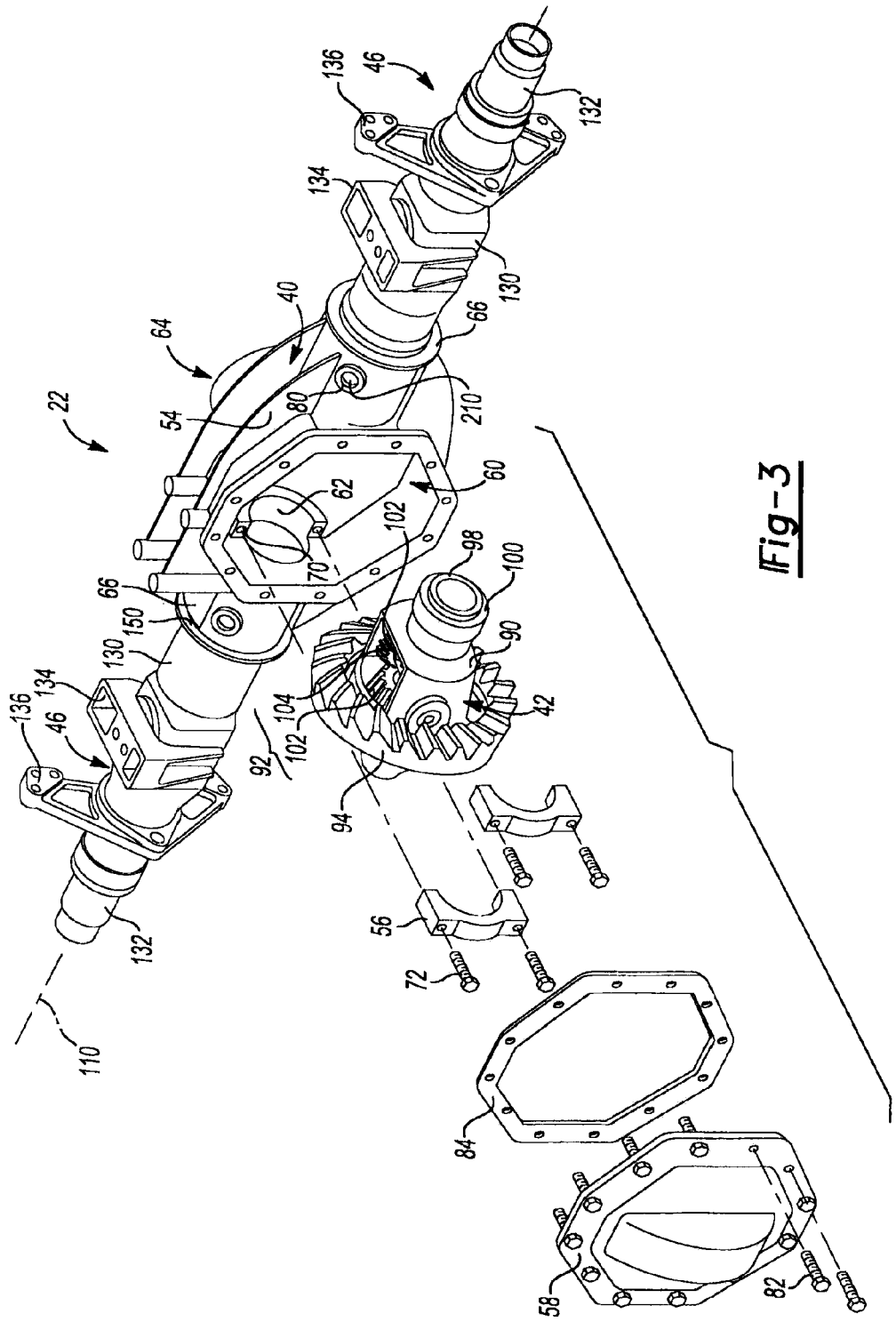
FIG. 3 is a partially exploded rear perspective view of the axle of FIG. 1.

With reference to FIGS. 2 and 3, the rear axle 22 can be a Salisbury axle having a Salisbury carrier assembly 40, a differential 42, an input pinion 44, a pair of axle tube assemblies 46 and a pair of wheel hubs 48. The differential 42 has been illustrated in FIG. 3 as being rotated out of position relative to the Salisbury carrier assembly 40 for purposes of clarity.

The Salisbury carrier assembly 40 can include a Salisbury carrier housing 54, a pair of bearing caps 56 and a differential cover 58. The Salisbury carrier housing 54 can be formed of a first material, such as nodular cast iron. With additional reference to FIGS. 3 and 4, the Salisbury carrier housing 54 can define a differential opening 60, a pair of bearing journals 62, a pinion mount 64, a pair of collars 66 and a pair of axle tube apertures 68. The differential opening 60 can be configured to receive the differential therethrough. The bearing journals 62 can include threaded holes 70 that permit the bearing caps 56 to be fixedly but removably coupled thereto via threaded fasteners 72. The pinion mount 64 can be formed on a side of the Salisbury carrier housing 54 opposite the differential opening 60. The pinion mount 64 can define a pinion aperture 76. The collars 66 are disposed on opposite lateral sides of the Salisbury carrier housing 54. Each of the axle tube apertures 68 can be formed through a corresponding one of the collars 66. Each collar 66 can include one or more holes 80 that extend through the collar 66 and intersect an associated one of the axle tube apertures 68. The differential cover 58 can be secured to Salisbury carrier housing 54 via a plurality of threaded fasteners 82 to close the differential opening 60. It will be appreciated that a gasket 84 or a sealant (not shown), such as PERMATEX® is disposed between the differential cover 58 and the Salisbury carrier housing 54.

Figure 4:
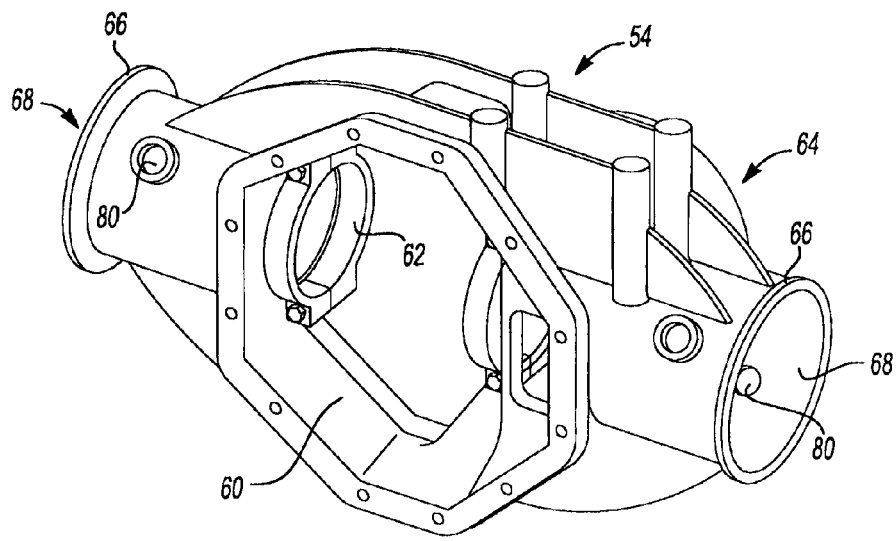
FIG. 4 is a rear perspective view of a portion of the axle of FIG. 1 illustrating the Salisbury carrier housing in more detail.
Figure 5:
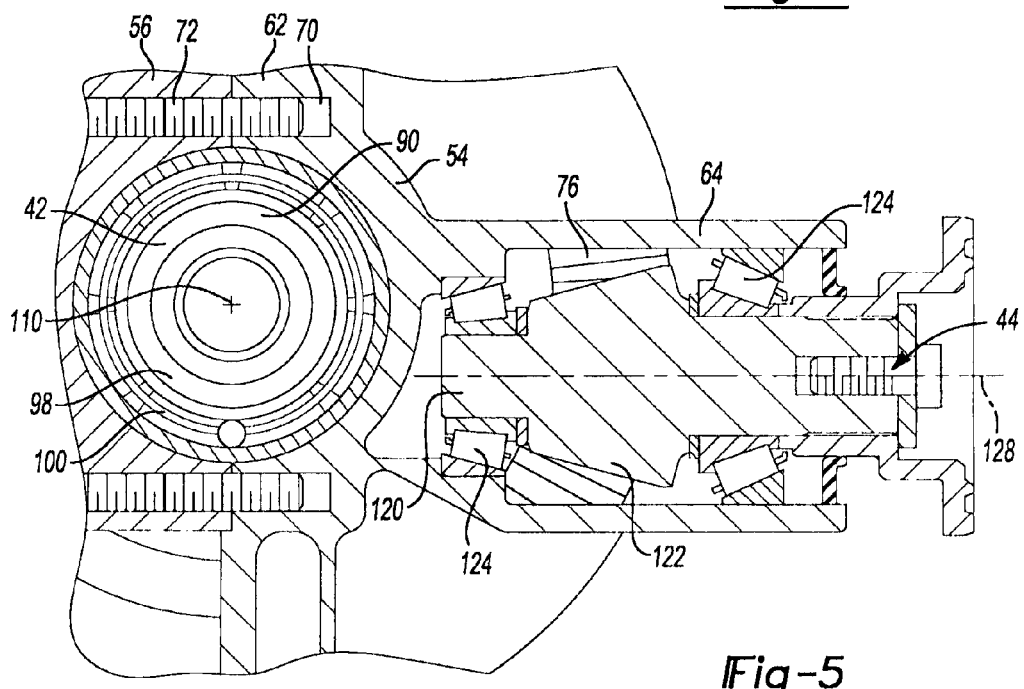
FIG. 5 is a sectional view of a portion of the axle of FIG. 1 taken through the rotational axis of the pinion perpendicular to a rotational axis of the differential.

With reference to FIGS. 3 and 5, the differential 42 can be conventional in its construction and can include a differential housing 90, differential gear set 92 that is supported for rotation within the differential housing 90, and a ring gear 94 that is coupled to the differential housing 90. The differential housing 90 can include a pair of trunnions 98 onto which respective sets of bearings 100 can be placed. The differential gear set 92 can include a pair of side gears 102 and a plurality of pinions 104 that meshingly engage the side gears 102. The differential 42 can be received through the differential opening 60 in the Salisbury carrier housing 54 such that the bearings 100 are received between respective sets of bearing journals 62 and bearing caps 56. As such, it will be appreciated that the Salisbury carrier assembly 40 supports the differential 42 for rotation about an axis 110 that extends through the axle tube apertures 68 (FIG. 4).

The input pinion 44 can include a pinion shaft 120, a pinion 122 and a pair of pinion bearings 124. The pinion 122 can be coupled to the pinion shaft 120 for rotation therewith. The pinion bearings 124 can be coupled to the pinion shaft 120. The input pinion 44 can be received in the pinion aperture 76 in the pinion mount 64 such that the pinion 122 is meshingly engaged with the ring gear 94. The pinion bearings 124 can be coupled to the Salisbury carrier housing 54 to support the pinion 122 for rotation about a pinion axis 128 that can be generally perpendicular to the rotational axis 110 of the differential 42. In the particular example provided, the pinion bearings 124 are disposed on opposite sides of the pinion 122 such that one of the pinion bearings 124 is located between the rotational axis 110 of the differential and the teeth (not specifically shown) of the ring gear 94.

Figure 6:
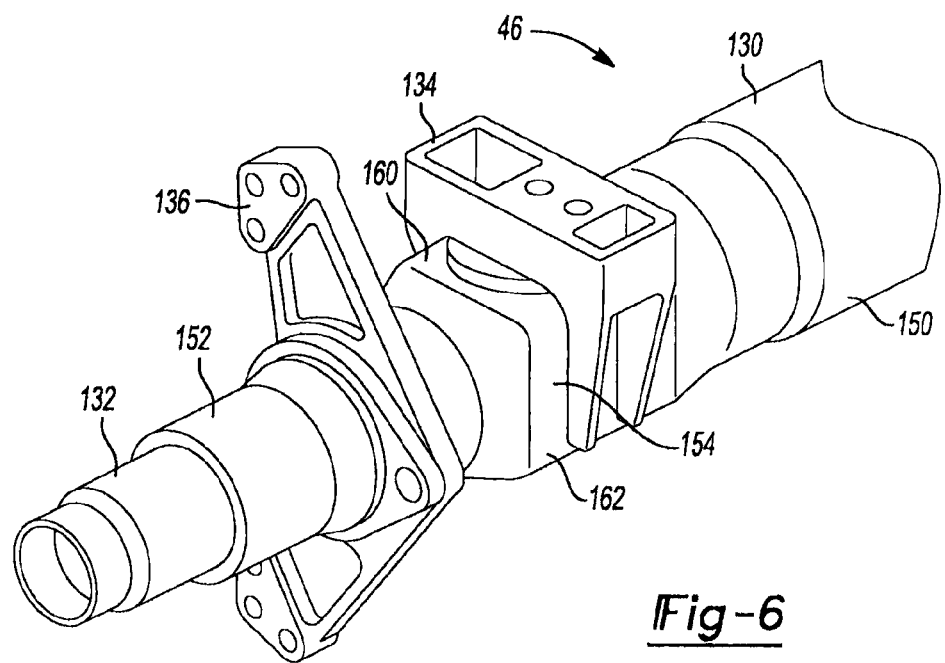
FIG. 6 is a perspective view of a portion of the axle of FIG. 1, illustrating an axle tube assembly in greater detail.

With reference to FIGS. 3 and 6, the axle tube assemblies 46 can include an axle tube 130, a spindle 132, a spring mount 134 and a brake mount 136. The brake mount 136, which can be welded to the axle tube 130, can be configured in a conventional manner to mount a brake system (not shown), such as a brake caliper (not shown).

Figure 7:
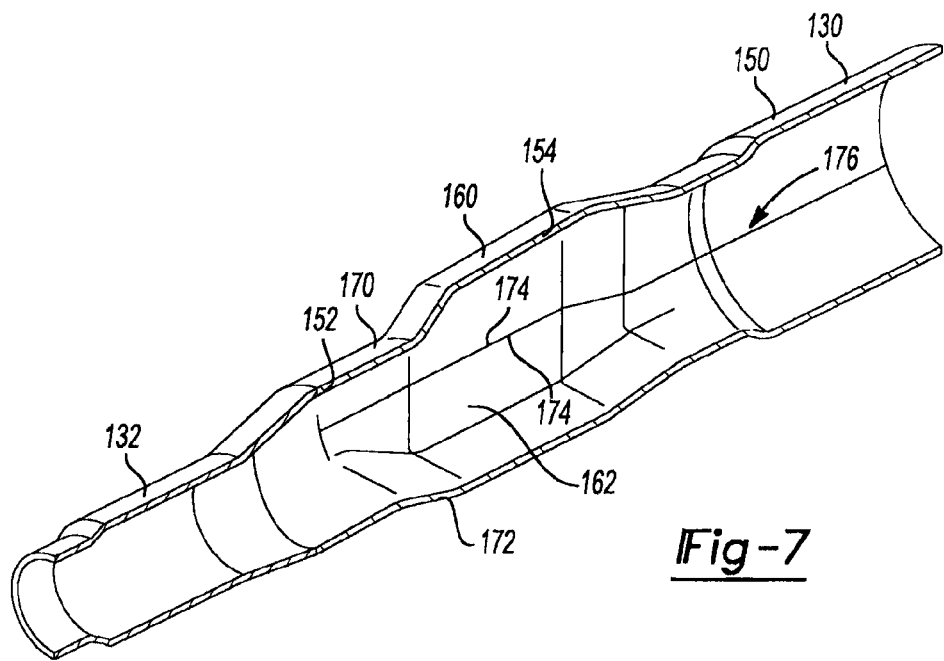
FIG. 7 is a longitudinal cross-sectional view of a portion of the axle tube assembly.

With reference to FIGS. 6 and 7, the axle tube 130 can be formed of a high strength steel (i.e., a steel having a yield strength of at least about 90 ksi or 620 MPa) and can include a proximal end 150, a distal end 152 and a mount portion 154 that is located between the proximal end 150 and the distal end 152. The proximal end 150 of the axle tube 130 can be larger in diameter than an associated one of the axle tube apertures 68. The mount portion 154 can have a top wall 160 and a pair of opposite side walls 162. The side walls 162 can be oriented generally perpendicular to the top wall 160.

In the particular example provided, the axle tube 130 is formed of first and second shell members 170 and 172, respectively, that have been welded together along the edges 174 at which they abut (the weld is generally indicated by reference numeral 176). The proximal and distal ends 150 and 152 can be machined in an appropriate machining process so that they are sized to engage the axle tube aperture 68 (FIG. 4) and the spindle 132, respectively. For example, the proximal end 150 of the axle tube 130 can be machined in a chip forming process, such as turning or grinding, while the distal end 152 of the axle tube 130 can be machined in a chip forming process such as turning or milling.

Figure 8:
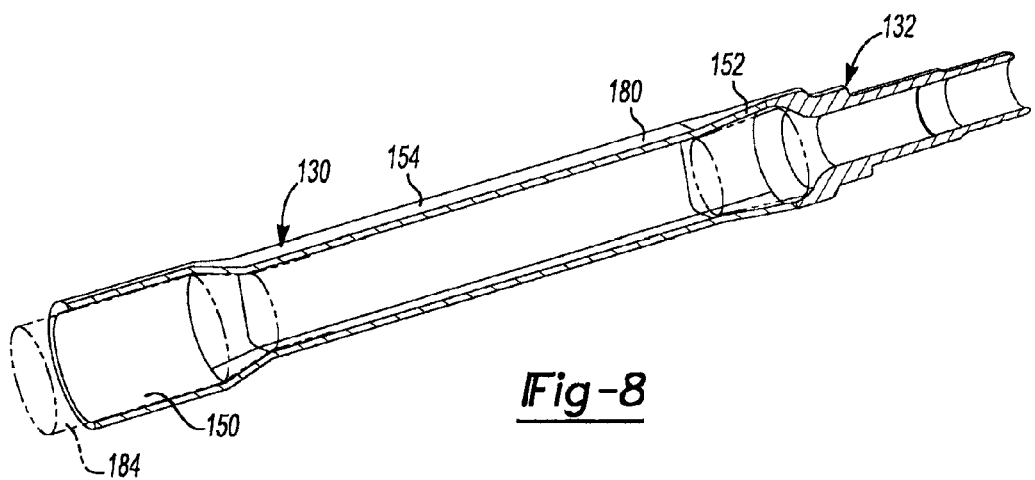
FIG. 8 is a view similar to that of FIG. 7 but illustrating a different construction of the axle tube.

It will be appreciated, however, that the axle tubes 130 can be unitarily formed of a tubular workpiece material having an outer surface 180 with a first cross-sectional shape as shown in FIG. 8. The tubular workpiece can be processed in an appropriate metal working process, such as swaging, so that one or more portions of the outer surface 180 have a second cross-sectional shape that is different from the first cross-sectional shape. For example, a square tubing may be employed as the tubular workpiece and the opposite ends of the workpiece may be swaged to form the proximal and distal ends 150 and 152 of the axle tube 130 such that the proximal and distal ends 150 and 152 have a cross-section with a circular outer surface. A mandrel 184 (shown in phantom) may be inserted into the tubular workpiece to control the shape and size of the inner surface of the workpiece at the proximal and distal ends 150 and 152. It will be appreciated that the proximal and distal ends 150 and 152 can be sized smaller or larger than the than the remainder of the workpiece.

The spindle 132 can be formed in an appropriate process, such as hot forming, and can be machined to receive bearings (not shown) and seals (not shown) that engage the wheel hub 48 (FIG. 2). The spindle 132 can be secured to the distal end 152 of the axle tube 130 in an appropriate manner, such as friction welding.

Figure 9:
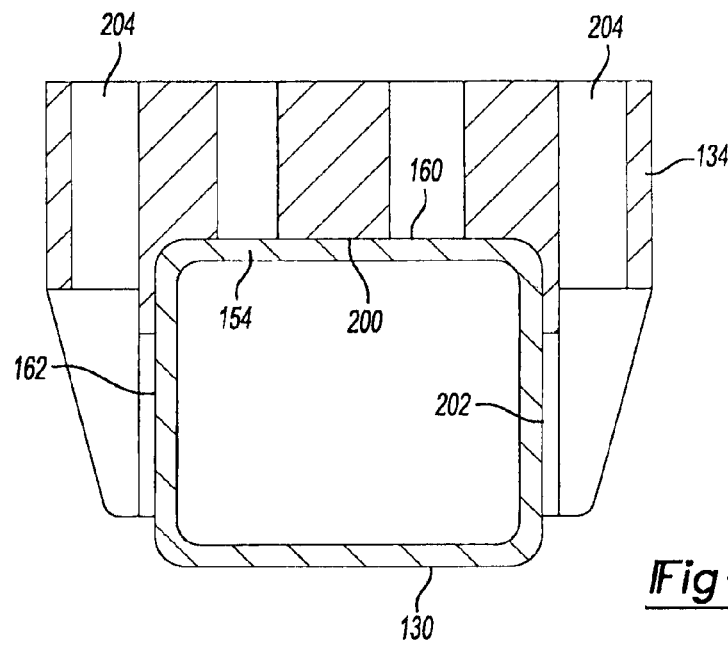
FIG. 9 is a cross-sectional view of the axle tube assembly taken through the spring mount and the mounting portion of the axle tube.

With reference to FIGS. 6 and 9, the spring mount 134 can be a generally C-shaped structure that can be configured to matingly engage the mount portion 154 of the axle tube 130. In the particular example provided, the spring mount 134 includes a lower surface 200 and a pair of side walls 202 that are configured to abut the top wall 160 and side walls 162, respectively. A pair of mounting apertures 204 can be formed through the spring mount 134 and can permit a fastener, such as a U-bolt (not shown) to be positioned through the spring mount 134 and around the axle tube 130 to facilitate the coupling of a spring (not shown) to the spring mount 134. The spring mount 134 can be fixedly coupled to the axle tube 130 by any appropriate means, such as welding.

With renewed reference to FIG. 3, the bearing caps 56 can be removed from the Salisbury carrier housing 54 to expose the bearing journals 62. The differential 42 and bearings 100 can be installed into the Salisbury carrier housing 54 through the differential opening 60 and positioned on the bearing journals 62. The bearing caps 56 can be replaced to the bearing journals 62 to permit the Salisbury carrier housing 54 to support the differential 42 for rotation about the axis 110, which extends through the axle tube apertures 68 (FIG. 4). The spring mount 134 and the brake mount 136 can be fixedly coupled to the axle tube 130. The axle tubes 130 can be positioned the axle tube apertures 68 (FIG. 4) and radially positioned (i.e., clocked) to the Salisbury carrier housing 54 to orient the spring mount 134 and the brake mount 136 in a predetermined orientation. The proximal ends 150 of the axle tubes 130 can be driven into the axle tube apertures 68 (FIG. 4) to secure the axle tubes 130 to the Salisbury carrier housing 54. It will be appreciated that as the proximal ends 150 are larger in diameter than the axle tube apertures 68 (FIG. 4), a resulting interference fit will fix the axle tubes 130 to the Salisbury carrier housing 54. If desired, heat can be applied to all or portions of the Salisbury carrier housing 54 and/or all or portions of the axle tubes 130 can be cooled to reduce the force that is necessary to drive the proximal ends 150 of the axle tubes 130 into the axle tube apertures 68 (FIG. 4). A weld 210 can be applied to the proximal ends 150 of the axle tubes 130 through the holes 80 in the collars 66 to inhibit relative rotation between the axle tubes 130 and the Salisbury carrier housing 54. The weld 210 can comprise a spot weld or a plug weld, for example.

Where the axle tubes 130 are formed of first and second shell members 170 and 172 that have been welded together along the edges 174 at which they abut as shown in FIG. 8, the axle tubes 130 can be radially aligned to the Salisbury carrier housing 54 such that the edges 174 are disposed in a plane that intersects a neutral axis of the rear axle 22. In the particular example provided, the plane would include the axis 110, the welds 176 (FIG. 7) and would be generally perpendicular to the rotational axis 128 (FIG. 5) of the pinion 122 (FIG. 5).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method of forming a Salisbury axle, the method comprising:
    forming a Salisbury carrier assembly having a Salisbury carrier housing that is made of nodular iron, the Salisbury carrier housing having a differential opening, a first axle tube aperture and a second axle tube aperture;
    installing a differential to a set of bearing journals formed by the Salisbury carrier assembly such that the differential is supported for rotation within the Salisbury carrier assembly about an axis that extends through the first and second axle tube apertures, the differential being received through the differential opening in the Salisbury carrier housing;
    forming a pair of axle tubes from a steel, each of the axle tubes having a circular proximal end, a circular distal end and a mount portion between the proximal and distal ends, the proximal ends of the axle tubes being larger in diameter than the first and second axle tube apertures, the mount portion having a top wall and a pair of opposite side walls, the side walls being oriented generally perpendicular to the top wall; and
    inserting the proximal ends of the axle tubes into the first and second axle tube apertures;
    wherein each of the axle tubes includes a first shell member and a second shell member and wherein the method further comprises welding the first and second shell members together to form a tubular workpiece;
    wherein a plane is defined where the first and second shell members abut one another and wherein the plane is disposed along a neutral axis of the Salisbury axle when the axle tubes are inserted into the first and second axle tube apertures; and
    wherein the tubular workpiece has an outer surface with a first cross-sectional shape, at least a portion of the outer surface of the tubular workpiece being deformed to have a second cross-sectional shape that is different than the first cross-sectional shape.

2. The method of claim 1, wherein prior to inserting the proximal ends of the axle tubes into the first and second axle tube apertures, the method comprises radially aligning the axle tubes to the Salisbury carrier housing.

3. The method of claim 1, further comprising machining at least one of the proximal and distal ends of the axle tube in a metal removing operation.

4. The method of claim 1, wherein the first cross-sectional shape is a square and the second cross-sectional shape is a circle.

5. The method of claim 1, further comprising:
    inserting a mandrel into the tubular workpiece; and
    deforming the at least the portion of the outer surface of the tubular workpiece to conform to the second cross-sectional shape.

6. The method of claim 1, wherein the first and second axle tube apertures are formed through a collar portion, wherein at least one hole is formed through each collar portion, and wherein the method further comprises welding the axle tubes through the at least one hole in the collars to inhibit relative rotation between the axle tubes and the Salisbury carrier housing.

7. A method of forming a Salisbury axle, the method comprising:
- forming a Salisbury carrier assembly having a Salisbury carrier housing that is made of nodular iron, the Salisbury carrier housing having a differential opening, and a pair of collars, each of the collars defining an axle tube aperture and a hole that extends through the collar and intersects the axle tube aperture;
- removing a pair of bearing caps from the Salisbury carrier housing to expose a pair of bearing journals;
- installing a differential to the bearing journals, the differential being received through the differential opening in the Salisbury carrier housing;
- replacing the pair of bearing caps to the bearing journals to permit the differential to be supported for rotation by the Salisbury carrier housing about an axis that extends through the axle tube apertures;
- forming a pair of axle tubes from steel, each of the axle tubes having a circular proximal end, a circular distal end and a mount portion between the proximal and distal ends, the proximal ends of the axle tubes being larger in diameter than the axle tube apertures, the mount portion having a top wall that is substantially flat;
- inserting the proximal ends of the axle tubes into the axle tube apertures; and
- welding the axle tubes through the holes in the collars to inhibit rotation of the axle tube relative to the Salisbury carrier housing;
- wherein each axle tube includes a first shell member and a second shell member that are welded to one another to form a tubular workpiece;
- wherein a plane is defined where the first and second shell members abut one another and wherein the plane is disposed along a neutral axis of the Salisbury axle when the axle tubes are inserted into the first and second axle tube apertures; and
- wherein the tubular workpiece has an outer surface with a first cross-sectional shape, at least a portion of the outer surface of the tubular workpiece being deformed to have a second cross-sectional shape that is different than the first cross-sectional shape.

8. The method of claim 7, wherein the Salisbury carrier housing defines a pinion aperture, wherein the differential includes a ring gear and wherein the method further includes installing an input pinion through the pinion aperture, the input pinion meshingly engaging the ring gear.

9. The method of claim 8, wherein a bearing supports an end of the input pinion at a location between a set of teeth on the ring gear and the axis, the bearing having an outer race that is directly coupled to the Salisbury carrier housing.

10. The method of claim 7, wherein prior to inserting the proximal ends of the axle tubes into the axle tube apertures the method further comprises clocking the axle tube relative to the Salisbury carrier housing to orient the top surface in a predetermined orientation.

11. The method of claim 10, wherein the top surface is generally parallel to the neutral axis of the Salisbury axle.

12. The method of claim 7, further comprising rotatably mounting a wheel hub on each of the distal ends of the axle tubes.

13. The method of claim 7, further comprising mounting a spring pad to each of the mount portions.

* * * * *